United States Patent [19]

Deutsch

[11] Patent Number: 4,488,842

[45] Date of Patent: Dec. 18, 1984

[54] NOSE MEMBER FOR AN EXPANDIBLE BUSHING TYPE LOCKING ASSEMBLY

[75] Inventor: Richard A. Deutsch, Encino, Calif.

[73] Assignee: Adjustable Bushing Corp., North Hollywood, Calif.

[21] Appl. No.: 381,724

[22] Filed: May 24, 1982

[51] Int. Cl.³ ............................................. F16B 21/14
[52] U.S. Cl. ...................................... 411/33; 411/345; 411/351; 411/386; 411/340; 279/2 R
[58] Field of Search .................................... 411/24–28, 411/32–35, 188, 218, 340, 345, 356, 357, 351, 386, 403; 279/2 R

[56] References Cited

U.S. PATENT DOCUMENTS

| | | | |
|---|---|---|---|
| 2,423,799 | 7/1947 | Shelstad | 411/340 |
| 2,573,928 | 11/1951 | Peter | 279/2 |
| 3,192,820 | 7/1965 | Pitzer | 411/33 |

FOREIGN PATENT DOCUMENTS

| | | | |
|---|---|---|---|
| 1338898 | 8/1963 | France | 411/386 |
| 212370 | 3/1924 | United Kingdom | 411/345 |
| 317445 | 4/1930 | United Kingdom | 411/213 |

Primary Examiner—Gary L. Smith
Assistant Examiner—Neill Wilson
Attorney, Agent, or Firm—Roylance, Abrams, Berdo & Goodman

[57] ABSTRACT

An improvement to expansible bushing type locking pins which include a handle or clip having camming means at one end to operate the bushings. Such handles or clips include an opening which cooperates with the adjusting nut on the free end of the locking pin to secure the assemblage together and in place on the parts to be assembled using the locking pin and clip assembly. The improvement comprises a nose cone on the free end of the locking pin having a circular cross-sectional shape, the nose cone overlying the adjusting nut so that the criticality of position of the nut on the pin in the prior art is avoided, while at the same time the tapered nose cone provides a guiding function to mount the pin into the parts to be assembled together.

9 Claims, 9 Drawing Figures

U.S. Patent  Dec. 18, 1984  4,488,842
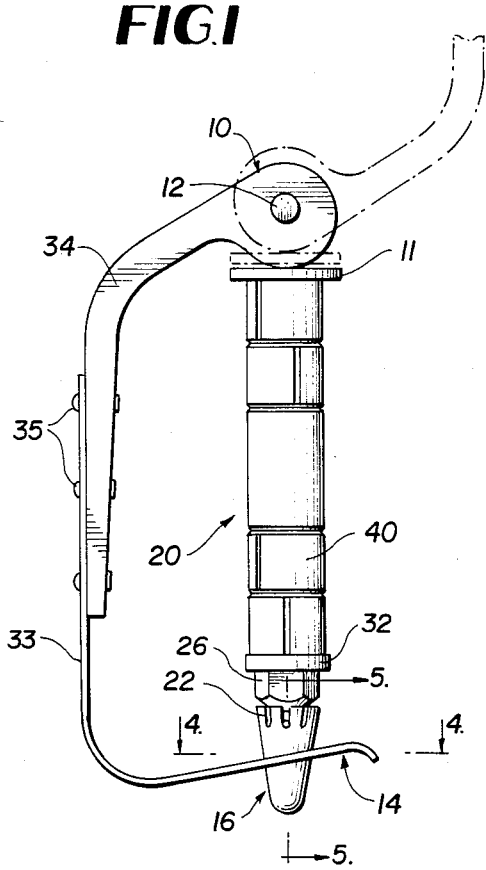
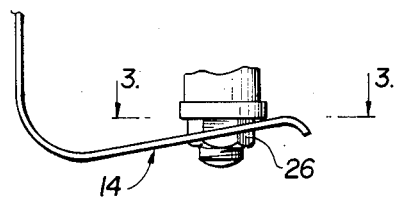
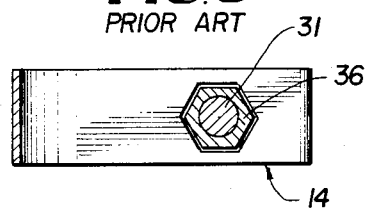
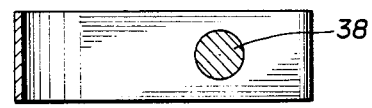
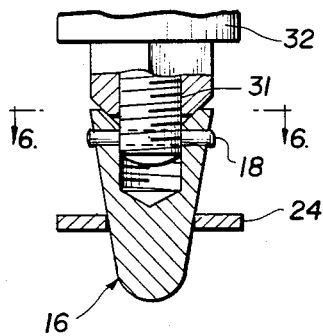
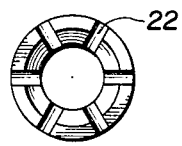
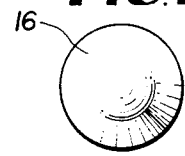
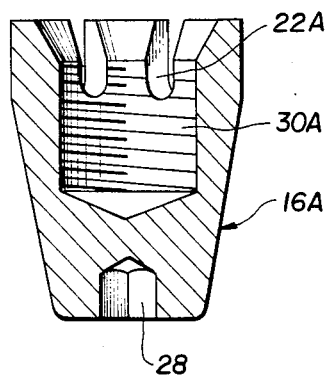
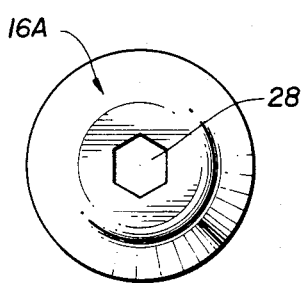

NOSE MEMBER FOR AN EXPANDIBLE BUSHING TYPE LOCKING ASSEMBLY

FIELD OF THE INVENTION

The invention relates to quick release locking pins, and more in particular to an improved nose and locking nut arrangement cooperatively connected to, for example, a cam operated quick release locking pin for use in securely coupling rotable blades to the vertical rotor hub of a helicopter.

BACKGROUND OF THE INVENTION

Cam operated and other types of quick release locking pins, without the nose arrangement of the invention have been used in the prior art to secure structural steel, machinery and the like to static structures, such as concrete or masonry walls, floors or the like. Such locking devices are described in a U.S. Patent to Pitzer, U.S. Pat. No. 3,192,820, the disclosure of which is incorporated herein by reference. This locking device includes a plurality of radially expansible bushings, fully described in a prior issued patent to Pitzer, U.S. Pat. No. 3,009,747, the disclosure in which is likewise incorporated herein by reference.

A number of problems have arisen in the use of these prior art locking pins when such pins are used in cam operated devices with spring clips such as the present invention. In the prior art device the position of the hexagonal locking nut on the threaded shaft had to be accurately registered with the hexagonal shaped socket in the face of the spring clip to permit a quick and facile locking of the clip to the nut on the end of the expansible pin shaft. When securing together two structures, via two accurately aligned holes; more specifically, the nut had to be adjusted to accurately align with one of six positions in the hex socket in the spring clip, i.e., if the nut were not within about 10° of a 60° position it would not accurately register with the hex socket and thus the locking pin could not be snapped shut, as required in the locked position of the device. Moreover, in the closed position of the locking device the locking nut must be maintained stationary at a particular point on the threaded shaft of the locking pin so that it would lie inside the hex socket of the spring clip. In use this nut is adjusted to provide varying tension or pre-load on the radially expansible split bushings.

Finally, the invention nose cone solves these problems and in additon facilitates insertion of the locking pin into prepared holes, such as when mounting structures such as rotary wing blades and stub wings onto helicopters. Such stub wings are useful as missile racks and for carrying auxiliary fuel tanks on such aircraft.

OBJECTS AND SUMMARY OF THE INVENTION

Accordingly, an object of the invention is to provide a nose cone of the type described for the locking pin of the prior art, which overcomes the nut-socket registration problems and has other advantages as described herein.

Another object is to provide a means for securely anchoring the nose cone on the threaded shaft of the locking pin.

Still another object of the invention is to preserve the nut as the means for varying the tension on the radially expansible split bushings of the locking pin.

Another object is to provide a means for facilitating the mounting and dismounting of the invention nose cone on the threaded end of the locking pin shaft.

Yet another object is to provide an improved locking pin device which is especially satisfactory for use in mounting various structures onto aircraft, such as helicopters.

Still another object is to provide a novel combination which improves guidance of the locking pin device into the aligned holes of the various structures to be secured together by the locking pin.

BRIEF DESCRIPTION OF THE DRAWINGS

For accomplishing the above purposes and others which will be apparent to those of ordinary skill in the art, the description below of the invention herein, taken in conjunction with the following figures of the drawing will be found to be useful, wherein:

FIG. 1 is a side elevational view of one embodiment of the invention;

FIG. 2 is a view in partial side elevation of one embodiment of the prior art wherein problems, of the type described above, have been encountered;

FIG. 3 is a partial cross-section of the prior art device, taken along line 3—3 of FIG. 2;

FIG. 4 is a view in partial cross-section of the invention device taken along line 4—4 in FIG. 1 and corresponding to FIG. 3 of the prior art device for comparison purposes;

FIG. 5 is a partial enlarged cross-sectional view of the first embodiment of the invention device taken along line 5—5 of FIG. 1;

FIG. 6 is a top end view of the embodiment of the nose member shown in FIGS. 1 and 5 looking generally in the direction of the arrows 6 in FIG. 5;

FIG. 7 is a bottom end view of the first embodiment of the invention, shown in FIGS. 1 and 5;

FIG. 8 is a longitudinal cross-sectional view of a second embodiment of the invention nose cone; and FIG. 9 is a bottom end view of the second embodiment of the invention nose cone shown in FIG. 8.

DETAILED DESCRIPTION OF THE VARIOUS EMBODIMENTS OF THE INVENTION

FIG. 1 shows a first embodiment of the improved nose member arrangement of the invention, wherein means is provided for increasing the effective diameter of the locking pin after installation within the aligned holes of the parts to be attached together, such as a rotor blade and the vertically projecting rotor hub of a helicopter on which the blade is to be mounted. Conversely, the effective diameter of the pin is reduced prior to its removal from the aligned holes when it is desirable to disassembled the parts, i.e. in this example, to demount the helicopter blade from the rotary hub. The change in the effective diameter of the pin is accomplished by mounting a plurality of radially expansible or adjustable diameter split bushings about the shank of the center pin 31 and expanding the bushings when the pin is in position in the aligned holes of the helicopter structures. The operating means for the split bushings comprise a cam means operative when the spring clip is detached from said nose member 16 and is rotated away from such nose about a pivot pin 12 located at the other end of the pin 31 opposite the conical nose 16. Upon counter-clockwise rotation of the spring clip away from the nose from the solid line to the dotted line position in FIG. 1, internal compressive forces act on the split bushings 40 to reduce their diameter. Conversely, to increase the diameter of the bushings, the spring clip is rotated clockwise toward the nose from the dotted line to the solid line position in FIG. 1.

As described more in detail in the above identified Pitzer patents, the teachings of which are incorporated herein by reference as needed to complete the teachings hereof, the lock pin itself comprises male and female split ring elements which are formed so as to have mating wedge surfaces which are positioned about the shaft of the pin. The outer female elements 40 may be elastically and radially contracted, and the internal male elements (not shown) are used to elastically and radially expand the female parts by application of an axial thrust, applied in the invention by the cam means, and may be returned elastically to their original diameter and form when the thrust is relieved. One or more pairs of such male and female parts may be employed, consisting of overlying female and underlying male wedge rings, the respective contiguous surfaces of which form an angle with the axis of the rings so that a longitudinal (axial) compressive force is generated to cause radial contraction and expansion of the female ring elements.

Accordingly, in FIG. 1, there is shown a bushing assembly 20 comprising radially expansible and contractible female split bushings 40 mounted on a threaded pin or shaft 31 (the end of which is more clearly shown in FIG. 5). At the top or cam operated end of the bushing assembly is a thrust washer or plate 11 against one surface of which a cam ring portion 10 forming part of the handle 34 rotates on a pivot pin 12. At the opposite end of the pin 31, which is threaded, a self-locking nut 26 is adjustably threadably mounted. The nut 26 can be tightly screwed with a bushing 40 on a ring portion 32, which also could be a separate washer-like member.

Below the locking nut 26 on the free end of pin 31 is a tapered conical nose 16 made of a lightweight metal such as aluminum which screws onto the threaded end of the pin 31 which extends below the locking nut 26. The smooth end of the nose, which is of a circular cross-sectional shape, is easily received within a circular hole 38 located in the spring clip 34 (more clearly shown in FIG. 4). When the clip or handle 34 is cammed against thrust washer 11 toward the nose end of the locking pin and cam ring 10 rotates in a counter-clockwise direction in FIG. 1 about the pivot 12, the circular opening 38 in the spring clip 33 (the clip 33 being riveted to the clip handle 34 by rivets 35) easily receives the smooth end of the nose with an action.

FIGS. 2 and 3 show a locking pin of the prior art wherein a locking nut 26 is recieved by and maintained at a fixed position, within a hexagonal socket 36 in a spring 14.

The conical nose 16 of the invention is further provided with crenulations or slots 22, six being shown by way of example, (also see FIGS. 6 and 8), any opposing pair of which matingly recieve a locking pin 18 (more clearly seen in FIG. 5) for securing and holding the nose 16 stationary on pin 31.

FIG. 7 shows a bottom view of the nose member 18 of FIGS. 1 and 6. The invention nose member, in planes containing its axis, can be generally conical as in the first embodiment, or can be trapezoidal as in FIG. 8. Thus, the words "cone" and the like as used herein should be construed in the broad common usage sense rather than limited to a true cone or conical section in a mathematical sense.

FIG. 8 shows a second embodiment 16A of the invention nose cone. Parts the same as or closely similar to parts described above in regard to the first embodiment are indicated by the same reference numbers followed by "A". These include the threaded interior portion 30A which matingly receives the threaded end of the locking pin, as described above in regard to the first embodiment of the invention. The bottom face of the nose cone 16A is flat and includes a female hexagonal socket 28 into which an Allen wrench may be inserted for more easily screwing the nose cone 16A on and off the threaded end of the pin. FIG. 9 shows a bottom end view of the flattened end version of the second embodiment of the invention nose cone shown in FIG. 8; the hexagonal shape of the socket 20 in the flat end of the nose being clearly shown.

From the above detailed description, it can be seen that the improved nose cone of the present invention provides a number of advantageous features over the prior art split bushing locking pins without a nose cone, such as the locking pins shown in the above-mentioned patents to Pitzer, and as shown in FIGS. 2 and 3 herein. Such advantageous features include:
1. a lightweight nose cone which
2. overlies the critical adjusting nut on the end of the inner pin of the locking pin assembly.
3. A locking pin received in opposed crenelations in the nose cone skirt to more securely hold the nose cone stationary with respect to the pin.
4. An improved circular cross-section of the nose cone to overcome the prior art criticality of aligning the hexagonal locking nut within the hex socket in the spring clip, as shown in FIGS. 2 and 3, and as can best be appreciated from a comparison of FIGS. 3 and 4.
5. A hexagonal female slot formed in the flattened end of the nose cone which can receive an Allen wrench for more easily screwing the nose cone into tight contact into the face of the locking nut.
6. A tapered nose which is easily and quickly received within the aligned holes in cooperating members to be secured, such as helicopter structures, such as a rotor blade and the rotor hub.

Among the advantages of the invention, both as to the two embodiments 16 and 16A shown in the drawings as well as any other embodiments which could be developed by those skilled in the art using the teaching herein, is that the criticality of the adjustment of the locking nut 26 is removed. That is, the position of the lock nut 32 with respect to the washer 11 determines the pre-load on the plurality of split bushings 40, and thus the operational characteristics of the locking pin assembly in use. That is, depending upon how much the bushings 40 are expanded in the relaxed position of the device, the expanded position in use will be determined. Prior to the invention, the user was limited in that the lock nut had to be in one of the positions wherein the faces of the nut would fit into the hexagonal socket 36, see FIG. 3. If it were desired to finally adjust the nut to a position half way between two of these 60 degree points, then the spring clip would not operate properly. The round cross-section nose 16 or 16A alliviates this problem in that the spring clip 33 will operate properly in any position of the nose with respect to the nut. In accordance with the invention, the nut is first adjusted without regard to where it winds up on the pin with respect to the axis of the pin, then the nosecone is put into position, and then an opening is drilled for the lock pin 18. The spring clip will, of course, cooperate with the nose cone at any angular position of the nose cone with respect to the pin.

A concomitant advantage is that the rounded nose, especially the first embodiment 16 in the smaller sizes, aids in use of the invention lock pin. That is, where the parts to be secured together, such as a helicopter blade to the helicopter hub, are positioned and readied for application of the lock pin, there may exist a slight misalignment. Insertion of the smaller end nose cone 16 automatically adjusts the parts as the pin is inserted to the full diameter of the relaxed expansible bushings 40. Thus, the invention nose cone aids in usage of the lock pin so equipped by serving as a guide for insertion of the lock pin into the registering openings of the parts to be secured together.

As to the two embodiments, 16 and 16A of the invention shown and described, neither is really a preferred form in preference to the other in that they have different areas of application. The first form 16 of FIG. 1 with its "bullet-like" front end, is preferred in the smaller sizes of lock pins. The second embodiment 16A of FIG. 8 is preferred for use with larger sizes where tightening of the nose cone using the socket 28 is preferred and there is more heft for the generally larger sizes to accommodate this feaure. Further, in such larger sizes, were the nose cone extended and tapered out to a bullet-like end as in FIG. 1, the nose cone might well be excessively long.

All the foregoing, as well as many other highly important and paractical advantages attend the practice of this invention.

It is apparent from the foregoing that once the broad aspects of the invention are disclosed, many embodiments thereof will readily occur to those skilled in the art as well as modifications of the embodiments herein disclosed. Accordingly, it is intended that the foregoing disclosure be considered as purely illustrative and not in a limiting sense.

What is claimed is:

1. In a lock pin assembly of the type comprising a plurality of expansible bushing means mounted on an inner pin, a pre-load adjusting nut threadedly mounted on the free end of said inner pin, a clip means pivotally mounted on the other end of said inner pin and having a cam portion adapted to operate said plurality of expansible bushings on said inner pin between said cam portion and said nut, said clip means comprising a spring clip means at the free end thereof formed with an opening to clip over the free end of said inner pin, a nose member threadedly mounted on the free end of said inner pin outboard of said adjusting nut thereon, said nose member having a circular cross-sectional shape in planes perpendicular to the axis of said inner pin, means for securing said nose member to said extending end of said inner pin in an adjusted position of said nose member against said adjusting nut, said securing means comprising a plurality of crenelations formed in the end of said nose member which will face said nut in the assembled condition of said nose member on said pin, and said securing means further comprising a lock pin fitted into a pair of opposed ones of said plurality of crenelations and in an opening formed in said free end of said inner pin aligned with said pair of said crenelations.

2. In a lock pin assembly of the type comprising a plurality of expansible bushing means mounted on an inner pin, a pre-load adjusting nut threadedly mounted on the free end of said inner pin, a clip means pivotally mounted on the other end of said inner pin and having a cam portion adapted to operate said plurality of expansible bushings on said inner pin between said cam portion and said nut, said clip means comprising a spring clip means at the free end thereof formed with an opening to clip over the free end of said inner pin, a nose member threadedly mounted on the free end of said inner pin outboard of said adjusting nut thereon, said nose member being mounted on said pin independently of said adjusting nut, means other than said nose member for locking said adjusting nut in an adjusted position on said pin, said nose member having a circular cross-sectional shape in planes perpendicular to the axis of said inner pin, and said nose member's cross-sectional shape mating with said spring clip opening.

3. The combination of claim 2, and said nose member having a generally conical configuration in planes containing the axis of said pin when said nose member is mounted on said inner pin.

4. The combination of claim 2, wherein said nose member consists entirely of a lightweight metal.

5. The combination of claim 2, and means for securing said nose member to said extending end of said inner pin in an adjusted position of said nose member against said adjusting nut.

6. The combination of claim 5, wherein said securing means comprising a plurality of crenelations formed in the end of said nose member which will face said nut in the assembled condition of said nose member on said pin, and said securing means further comprising a lock pin fitted into a pair of opposed ones of said plurality of crenelations and in an opening formed in said free end of said inner pin aligned with said pair of said crenelations.

7. The combination of claim 2, wherein said nose member is formed with a front end of bullet-like configuration.

8. The combination of claim 2, wherein said nose member is formed with a flattened end generally perpendicular to the axis of said inner pin in the assembled together condition of said nose member on said pin.

9. The combination of claim 8, wherein said nose member is formed with a wrench socket in said free flattened end, whereby mounting and dismounting of said nose member on said pin is facilitated by use of a tool in said wrench socket.

* * * * *